June 24, 1924.
P. D. NICUOLA
JEWEL BOX
Filed Nov. 28, 1922  2 Sheets-Sheet 1
1,499,027
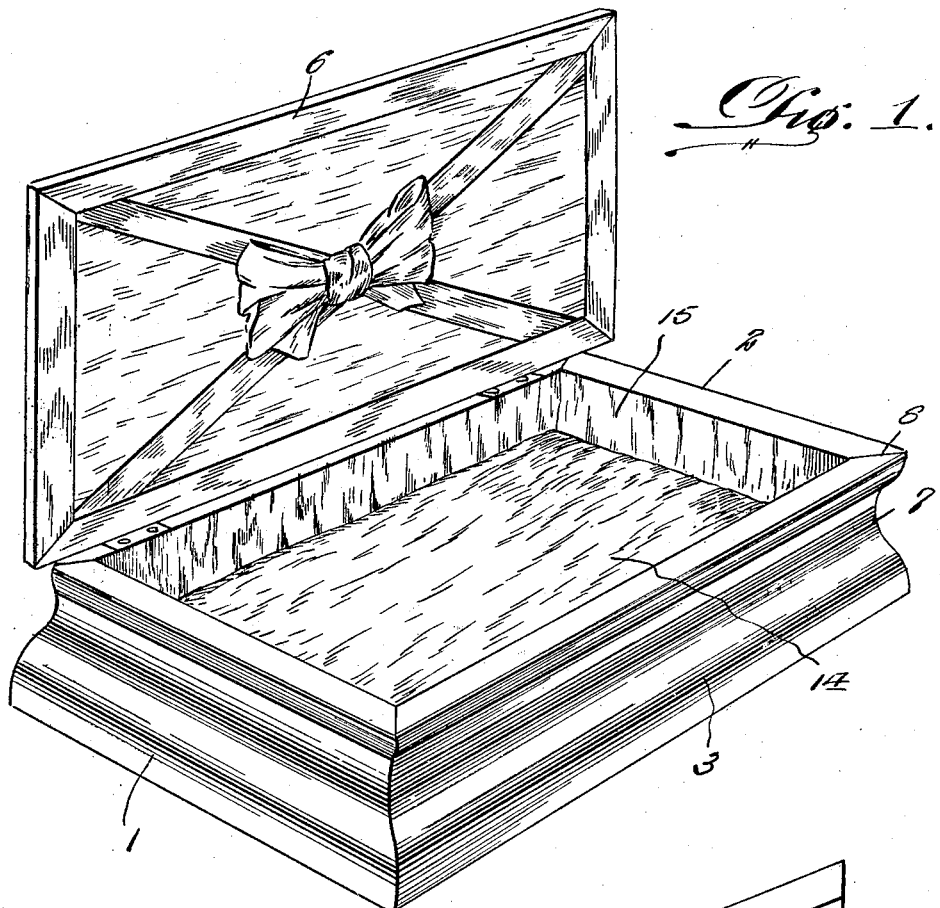
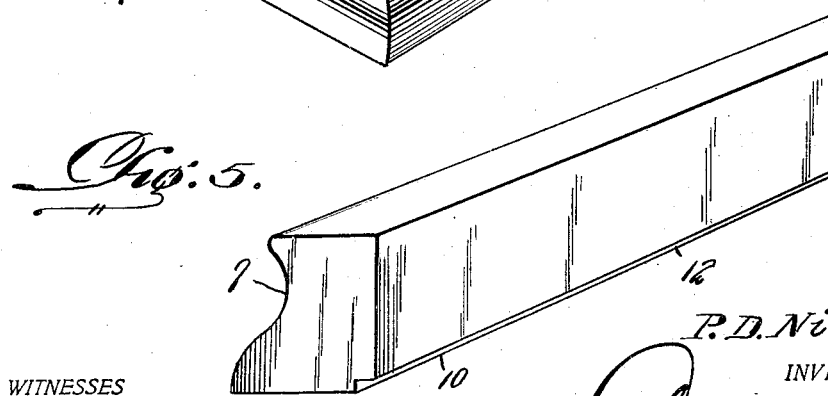
WITNESSES
P. D. Nicuola
INVENTOR
ATTORNEYS.

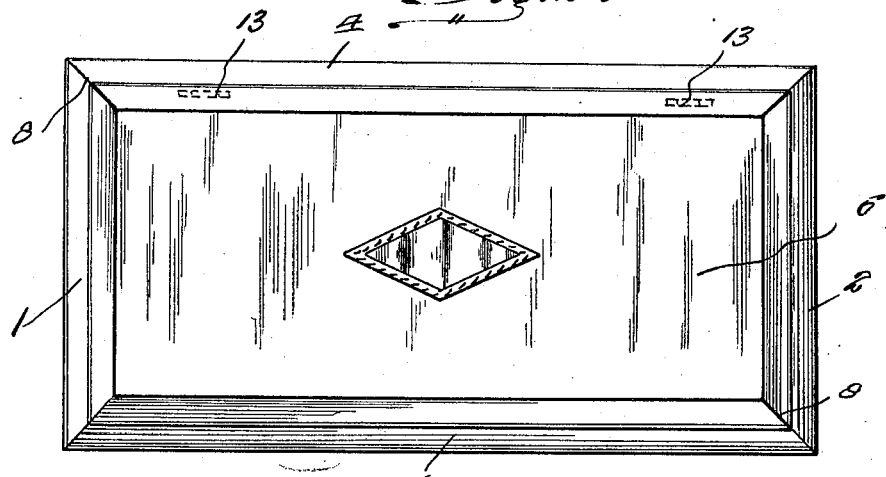
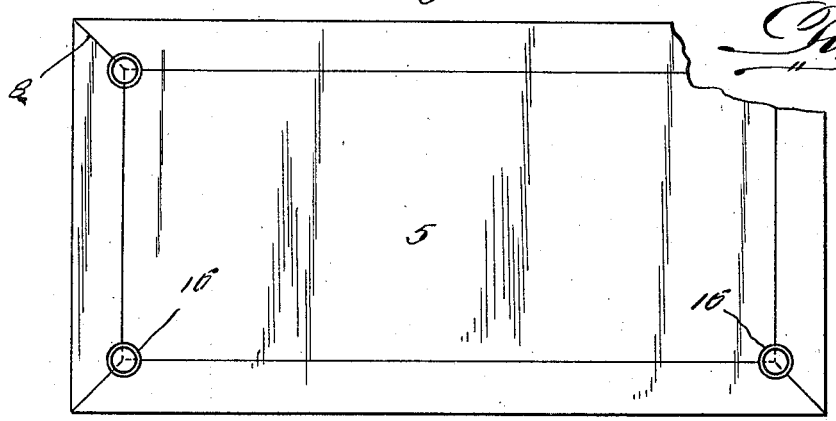
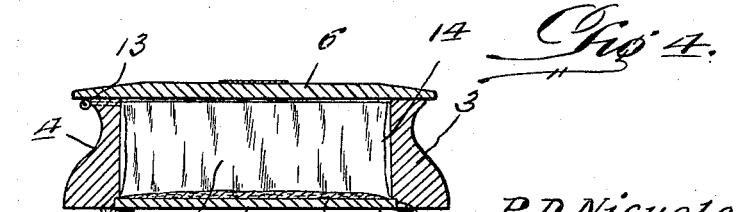

Patented June 24, 1924.

1,499,027

UNITED STATES PATENT OFFICE.

PETER D. NICUOLA, OF PEN ARGYL, PENNSYLVANIA.

JEWEL BOX.

Application filed November 28, 1922. Serial No. 603,734.

*To all whom it may concern:*

Be it known that I, PETER D. NICUOLA, citizen of the United States, residing at Pen Argyl, in the county of Northampton and State of Pennsylvania, have invented certain new and useful Improvements in Jewel Boxes, of which the following is a specification.

The present invention has relation to what is known as jewel boxes, and the primary object thereof resides in the provision of such an article that is of simple construction, inexpensive of manufacture, compact in form, and useful for a number of purposes.

The nature and advantages of the invention will be better understood when the following detailed description is read in connection with the accompanying drawings, the invention residing in the construction, combination, and arrangement of parts as claimed.

In the drawings forming part of this application, like numerals of reference indicate similar parts in the several views, and wherein:—

Figure 1 is a perspective view of a box constructed in accordance with the present invention, the lid thereof being shown in raised position.

Figure 2 is a top plan view of the box, the lid being shown as closed.

Figure 3 is a fragmentary bottom plan view of the article.

Figure 4 is a transverse sectional view thereof in a reduced form, and

Figure 5 is a perspective view of one of the machined side walls forming the box.

Having particular reference to the several views, I have shown a jewel box of substantially rectangular configuration embodying end walls 1 and 2, front and rear walls 3 and 4 respectively, a bottom 5 and hinged cover 6. The four side walls forming the box, each consist of a machined strip of wood or the like having the front edge thereof suitably designed as at 7 and having their opposite end portions cut upon an angle so as to closely contact with the adjacent strips forming the other walls of the box as shown at 8 in several of the figures. The adjacent edges of the different walls forming the box may be retained together by an adhesive, or the same may be rigidly secured by tacks or the like (not shown).

The lower inner edges of each of the said strip members comprising the walls of the box are longitudinally rabbeted as at 10 for presenting a longitudinally extending shoulder portion 12, the rabbets 10 of each of the side walls effectively producing means for receiving the bottom wall 5 between inner edges of the side walls of the box, wherein the lower surface of the bottom is substantially upon a line with the bottom edges of the walls.

The top 6 is hinged as at 13 to the outer edge of the rear wall 4 as clearly shown in Figures 1 and 2 and is of such dimensions as to extend outwardly a slight distance beyond the walls of the box, for presenting protruding edges whereby the lid may be easily opened.

The bottom and side walls of the box are adapted to receive a padding 14 to be covered by a fabric lining 15, which is suitably secured to the upper edges of the box being adhesive or the like.

Upon the bottom surface of the completed article and inwardly of the four corners thereof are suitably secured relatively small supporting feet 16, which are secured at the corners of the bottom 5 and overlie the end portions of the interfitting mitered ends of the sides and ends of the box and serve to additionally secure said sides and ends of said bottom in assembled relation independently of and in addition to the grooves used between these mitered ends. From this, it will be clear that should the bond between the end and side walls formed by the glue become impaired for any reason, due to heat, dampness, or otherwise, the seat will not only serve to support the receptacle but will also serve to hold the same in assembled relation, and if desired, this seat may be used and formed for holding said case in assembled relation independent of any other folding means.

While I have herein shown and described the preferred embodiment of the present invention, it is nevertheless to be understood that minor changes may be made therein without departing from the spirit and scope of the invention as claimed.

What I claim as new is:—

A jewel case comprising side and end wall members having ogee exterior surfaces and plane inner surfaces whereby the said walls are rendered thicker at their base portions than at their upper portions, a bottom panel inserted in the inner corner edge portion of all of the walls and having its lower surface flush with the lower edges of all of the walls, resilient supporting foot blocks applied to the corner portions of the bottom panel and the adjacent and meeting edges of the side and end wall members, a cover hingedly connected with the upper edge of one of the wall members and having edge portions projecting beyond the upper edges of the ogee surfaces of the wall members.

In testimony whereof I affix my signature.

PETER D. NICUOLA.